United States Patent [19]

Joy

[11] 4,144,989

[45] Mar. 20, 1979

[54] GRANULAR MATERIAL DISPENSER

[76] Inventor: Walter S. Joy, 12 W. 55th St., New York, N.Y. 10019

[21] Appl. No.: 832,339

[22] Filed: Sep. 12, 1977

[51] Int. Cl.² ............................................. G01F 71/28
[52] U.S. Cl. .................................... 222/438; 222/455; 222/456
[58] Field of Search ............................... 222/454–457, 222/437, 438, 305, 364, 362, 564

[56] References Cited

U.S. PATENT DOCUMENTS

| | | | |
|---|---|---|---|
| 1,328,184 | 1/1920 | Moore | 222/455 |
| 1,864,936 | 6/1932 | Reineking | 222/438 X |
| 2,243,452 | 5/1941 | Bickel et al. | 222/455 |
| 2,739,741 | 3/1956 | Barnett | 222/455 |
| 2,791,352 | 5/1957 | Roper | 222/437 X |
| 2,853,213 | 9/1958 | Buehlig | 222/455 |
| 2,899,115 | 8/1959 | Matter | 222/438 X |
| 3,687,341 | 8/1972 | Stanley et al. | 222/455 |

FOREIGN PATENT DOCUMENTS 780132  7/1957  United Kingdom ..................... 222/455

Primary Examiner—Allen N. Knowles
Assistant Examiner—Charles A. Marmor
Attorney, Agent, or Firm—Kenneth S. Goldfarb

[57] ABSTRACT

A granular material dispenser especially adapted for the pouring of granular materials, such as soap powder, powdered milk, coffee, and the like, whereby a predetermined amount of the material can be dispensed with each tilting and pouring so that an adequate measure of the ingredient necessary can be easily dispensed. The concept of this invention features attaching a receptacle to the package of granular material and by the use of baffles to fill a reservoir when the package is first overturned, setting the reservoir in a pouring position when the package is raised, and then dispensing the predetermined amount of granular material when the package is again overturned and the lid opened. An adjustable baffle may be provided to permit for varied measure.

2 Claims, 12 Drawing Figures

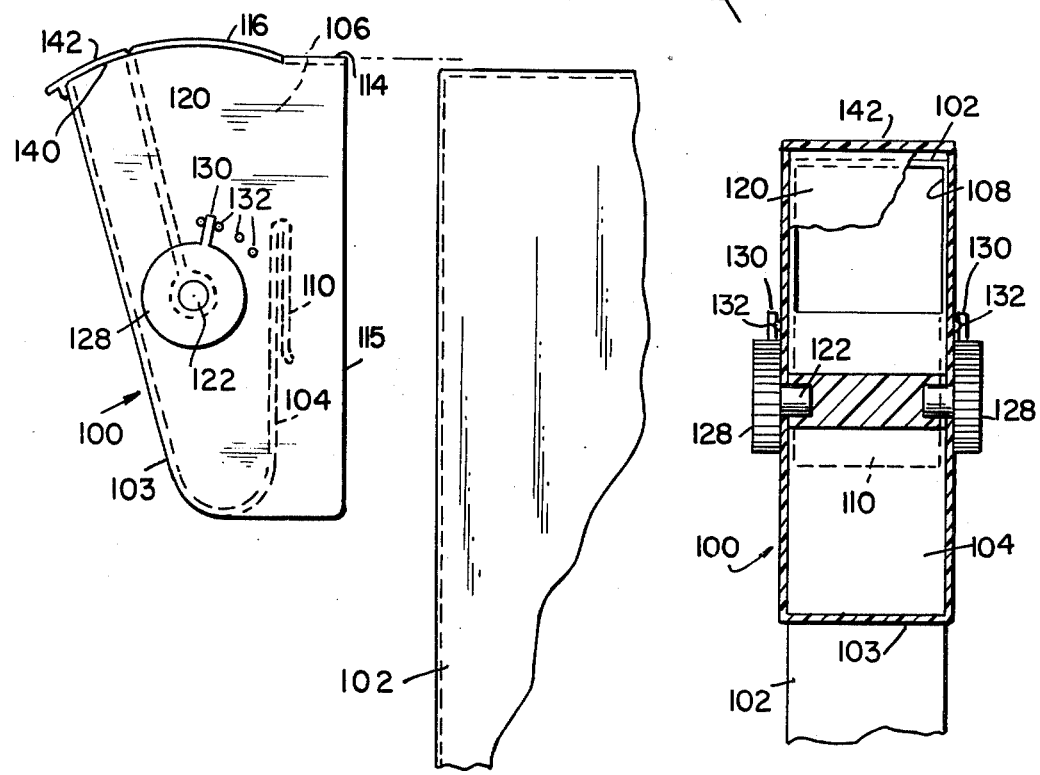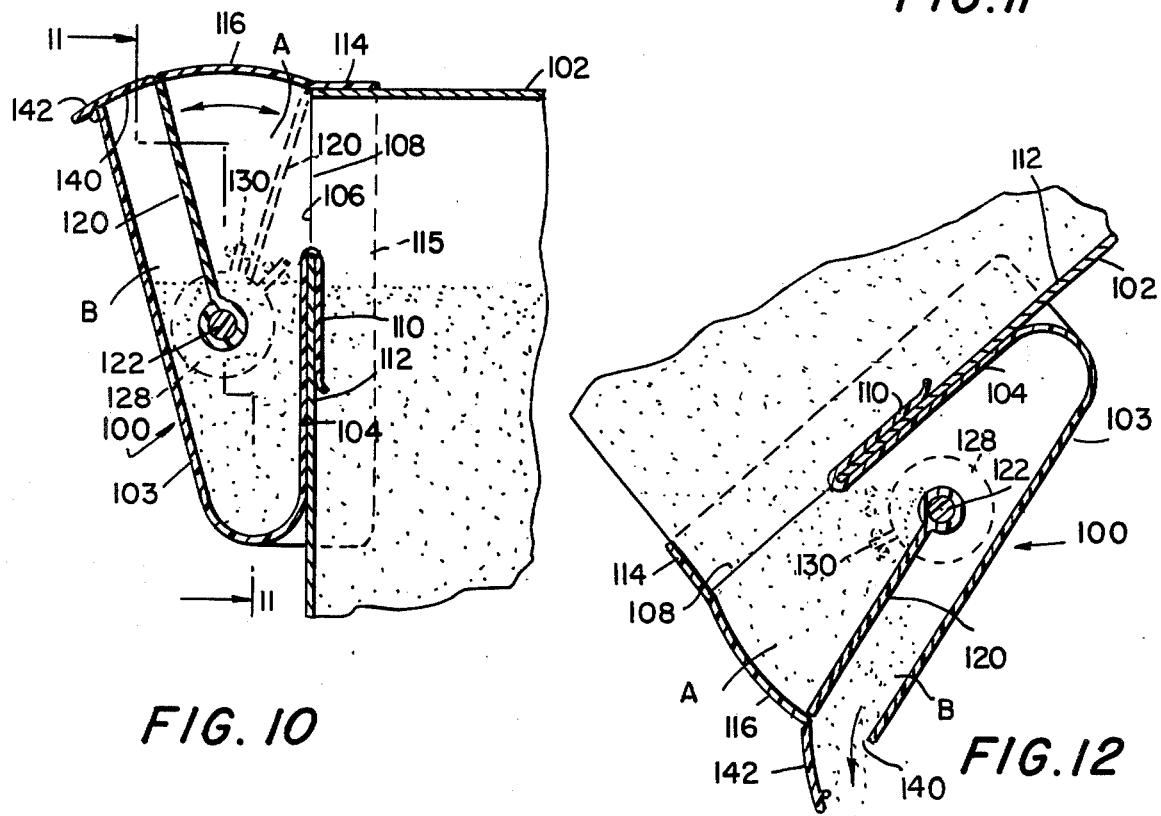

GRANULAR MATERIAL DISPENSER

BACKGROUND OF THE INVENTION

1. Field of the Invention

This invention relates to a dispenser and more particularly to a device for facilitating the dispensing of a predetermined mined measure of granular material.

2. Description of the Prior Art

In the past various dispensers for predetermined amounts of pourable materials have been devised. There are numerous inventions in the art for pouring a predetermind amount of liquor which may be fitted to the top of the container. However, there is apparently no device on the market for dispensing a predetermined amount of granular material which may be inexpensively mass produced out of any one of several suitable materials yet which will permit for predetermined measure of soap powder, coffee, powdered milk or the like to be dispensed in a convenient manner.

SUMMARY OF THE INVENTION

The concept of this invention features a molded plastic granular material dispenser which includes baffle means for permitting a predetermined measure of granular material to be first placed in a reservoir and subsequently dispensed. The concepts of this invention features the attachment of the device to a package of granular material in a simple manner and in alignment with the opening in the package so that each consecutive pouring will dispense the predetermined measure of granular material. In view of the fact that various amounts of the granular material may be desired, as, for example, a different amount of milk powder is necessary for obtaining a solution of reconstituted milk in pint, quart, or half gallon sizes, and in order to permit this result, a novel arrangement of an adjustable baffle is provided.

It is, therefore, the primary object of the present invention to provide a granular material dispenser which may be mass produced at relatively low cost and which may be easily attached and utilized in a foolproof manner for various types of pourable material.

These, together with the ancillary objects and features of this invention, which will become apparent as the following description proceeds, are attained by this granular material dispenser, preferred embodiments of which are illustrated in the accompanying drawings, by way of example only, wherein:

BRIEF DESCRIPTION OF THE DRAWINGS

FIG. 5 is a perspective view of another form of the invention especially adapted for soap powder, powdered milk, or the like;

FIG. 9 is an elevational view of a modified form of the invention for providing for various measures to be dispensed;

FIG. 10 is a vertical sectional view of the dispenser;

FIG. 11 is a vertical sectional view taken along the planes of lines 11—11 in FIG. 10; and, FIG. 12 is a schematic view showing the device in a pouring position.

DETAILED DESCRIPTION OF THE INVENTION

Figure 1:
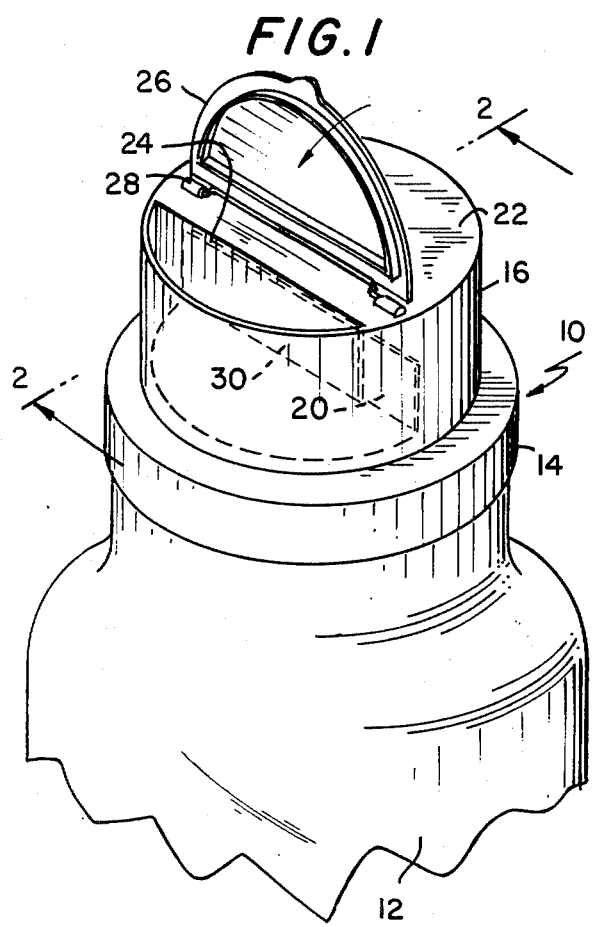
FIG. 1 is a perspective view of an embodiment of the invention especially adapted to be used in conjunction with a jar of coffee or like pourable material.

With continuing reference to the accompanying drawings, and with initial attention directed to FIGS. 1 through 4, reference numeral 10 is used to generally designate the granular material dispenser which is adapted to be secured on a package 12 of granular material such as, for example, a jar of coffee. The dispenser 10 has an internally threaded lower end 14 which may be stepped outwardly from the side wall 16 of the dispenser 10. A horizontal wall 18 integral with the cylindrical wall 16 extends approximately one-half the width of the opening and terminates in an upwardly extending baffle 20. The baffle 20 extends toward the top 22 of the receptacle forming the dispenser 10. The top 22 has an opening 24 therein which is adapted to be closed by a lid 26 hingedly secured, as at 28, to the top 22. A second baffle 30 depends from the top at a location immediately adjacent the opening 24 and extends part of the way down toward the horizontal wall 18.

Figure 3:
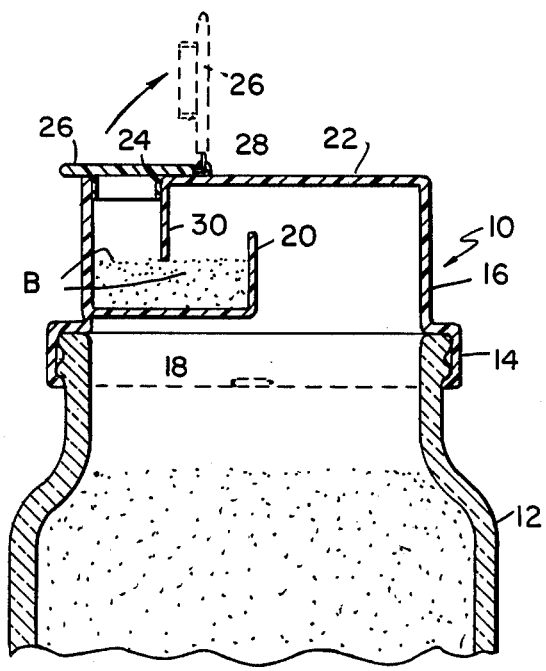
FIG. 3 is a view similar to FIG. 2, but showing the device as it is raised after filling the reservoir and made ready for an initial pouring.
Figure 2:
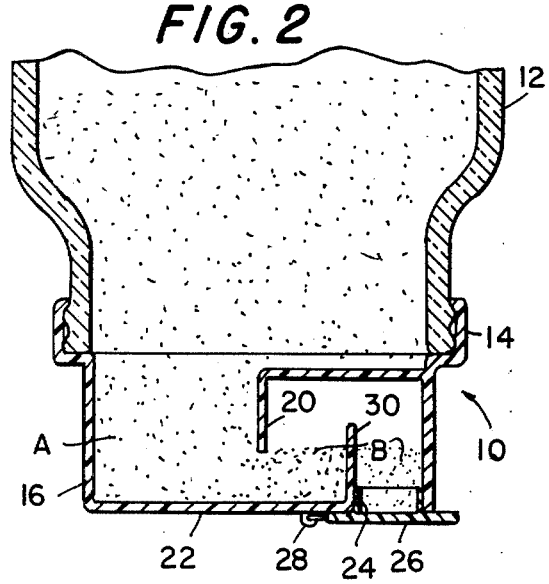
FIG. 2 is a vertical sectional view taken along the plane of line 2—2 in FIG. 1, showing the dispenser in an overturned position.
Figure 4:
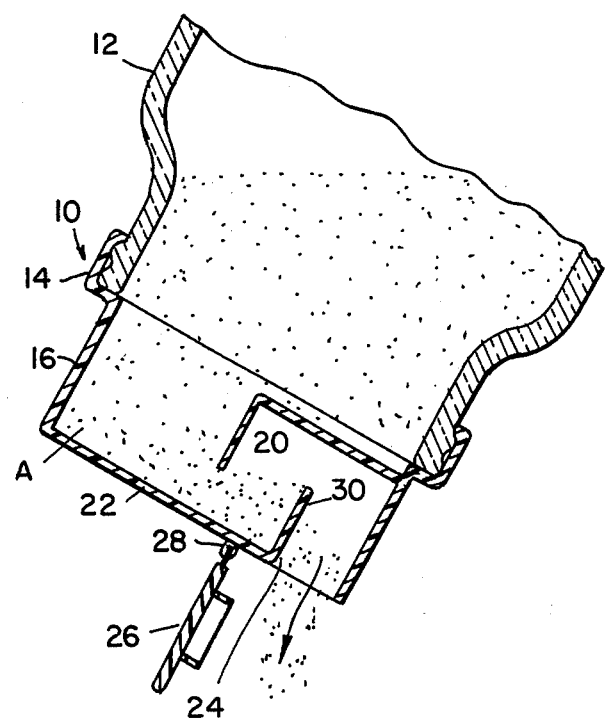
FIG. 4 is a view similar to FIG. 3 showing the dispenser in a pouring position.
Figure 5:
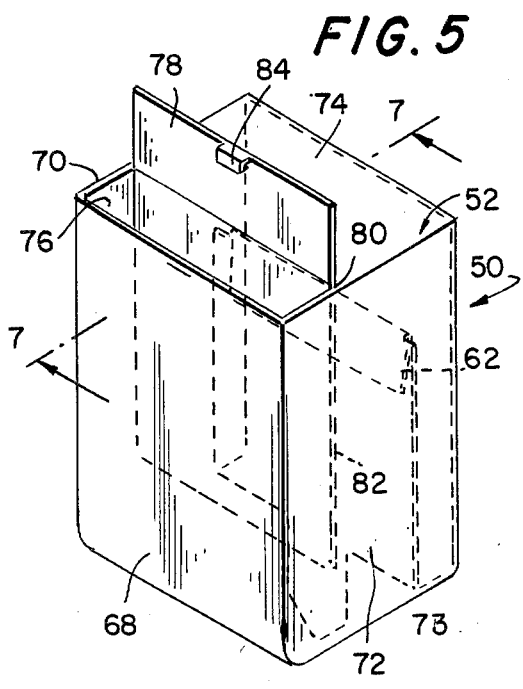
Figure 6:
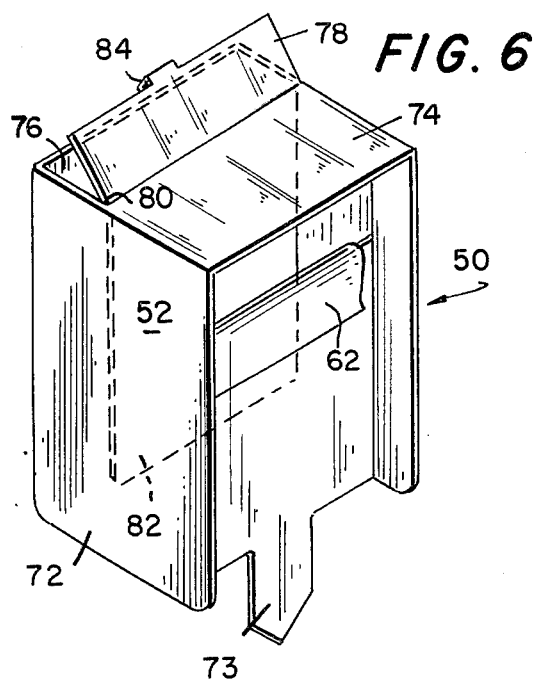
FIG. 6 is another perspective view of the invention looking in a different direction.
Figure 7:
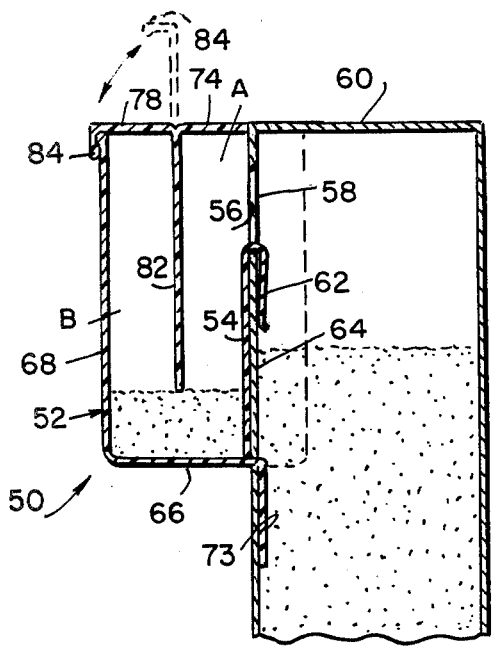
FIG. 7 is a vertical sectional view taken along the plane of line 7—7 in FIG. 5.
Figure 8:
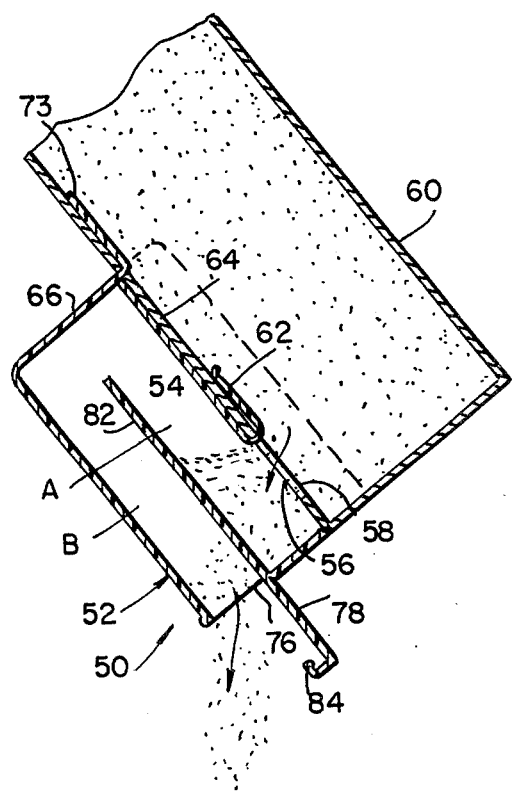
FIG. 8 is a sectional detail view showing the device in pouring position.

In use, and with the lid 26 closed, the jar 12 is overturned and granular material A fills the space between the wall 16 and the baffle 20. Further rotation of the container will cause the granular material to fill the space B as the container and dispenser is brought back to the up position as shown in FIG. 3. Then, opening the lid the material in space B will be dispensed while space A is again refilled.

Referring now to the embodiment shown in FIGS. 5 through 8, herein the dispenser 50 includes a receptacle 52 generally of a rectangular shape and having a side wall 54 provided with an opening 56 therein which is adapted to align with the pouring opening 58 formed in the package 60 of granular material. A clip-like member 62 integral with the side wall 54 and curved around and downwardly parallel to the wall 54 is hooked over the wall 64 of the package to hold the dispenser 50 in place. The dispenser is provided with a bottom 66, an outer side wall 68, and end walls 70 and 72. The top 74 of the dispenser is provided with an opening 76 adapted to be closed by a lid 78 hingedly secured as at 80 to the top 74. A baffle 82 is integral with the top 74 and extends downwardly toward the bottom 66 but not all the way. Member 73 is used to aid in maintaining the dispenser in position.

In use, and with the lid 78 closed and latched by means of a detent 84, the package and dispenser are overturned allowing the space A to be filled with granular material. Upon moving the material to an upright position once again, material will then fill the lower portion of the space B so that upon opening of the lid 78, material will be dispensed in the manner shown in FIG. 8 to a predetermined measure.

In order to provide an adjustable amount of material to be dispensed, there is provided an embodiment as shown in FIGS. 9 through 12. Herein, the dispenser 100 is adapted to be secured to a package 102 of powdered milk, soap, or the like in which an adjustable amount of material is to be dispensed. In order to accomplish this purpose, the dispenser 100 is in the form of a receptacle 103 having a side wall 104 provided with an opening 106 adapted to align with an opening 108 in the package 102. A clip 110 formed by bending over a portion of the wall 104 and extending it downwardly parallel thereto is provided for hooking over the wall 112 of the package 102 and which in combination with a flange 114, forming an extension of the top 116 of the receptacle 103, which also extends about the sides of the package as at 115, holds the dispenser 100 to the package 102.

The receptacle 103 may be of any particular configuration as desired but the top 116 is curved in an arc corresponding to the radius of a movable baffle 120 which is mounted on a shaft 122 journalled in the receptacle. The shaft may be fixed and the baffle 120 arranged to rotate thereabout or in the alternative, the baffle 120 may be secured to the shaft 122 which rotates. A knob 128 is mounted on the shaft 122 for rotating the baffle 120 and includes a detent 130 engageable with a selected number of stops 132 mounted on the receptacle 103 for seating the baffle 120 in a predetermined location. The top 116 is provided with an opening 140 closed by a lid 142 which is hingedly mounted for movement to an open position.

In use, an initial overturning will fill the space A between the baffle 120 and the side wall 104. Returning the device to the upright position will cause the material to fill the space B from whence it may be poured upon opening the lid.

Numerous modifications may be resorted to in connection with the granular material dispenser that come within the scope of the appended claims.

What is claimed is:

1. A granular material dispenser comprising a receptacle having a top wall, means for detachably securing said receptacle to a package of granular material, said means including a side wall of said receptacle having a clip portion integral with said side wall and depending therefrom, said side wall having an inlet opening therein, adapted to align with an opening in the package so that said clip portion hooks over said package, an adjustable baffle in said receptacle extending from the top of said receptacle toward the bottom thereof, a discharge opening in said top wall of said receptacle, with said baffle being positioned between said inlet opening and said discharge opening, a shaft mounted in said recepacle, the lower end of said baffle being mounted on said shaft so that said baffle is rotatably movable in said receptacle, means outwardly of said receptacle for positioning said baffle in a selected position, and means for holding said baffle in the selected position, and a lid for closing said discharge opening, said baffle extending to a position immediately adjacent said top wall, said top wall and said lid being arcuate in configuration corresponding to the radius of said baffle.

2. A granular material dispenser according to claim 1, including flange means at the top of said receptacle for seating on the package.

* * * * *